(12) United States Patent
Kawamura (10) Patent No.: US 12,322,788 B2
(45) Date of Patent: Jun. 3, 2025

(54) POSITIVE ELECTRODE FOR LITHIUM ION SECONDARY BATTERIES, ELECTRODE PASTE FOR LITHIUM ION SECONDARY BATTERIES, AND LITHIUM ION SECONDARY BATTERY

(71) Applicant: TORAY INDUSTRIES, INC., Tokyo (JP)

(72) Inventor: Hiroaki Kawamura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 665 days.

(21) Appl. No.: 17/298,366

(22) PCT Filed: Nov. 20, 2019

(86) PCT No.: PCT/JP2019/045400
§ 371 (c)(1),
(2) Date: May 28, 2021

(87) PCT Pub. No.: WO2020/116160
PCT Pub. Date: Jun. 11, 2020

(65) Prior Publication Data
US 2022/0006076 A1 Jan. 6, 2022

(30) Foreign Application Priority Data
Dec. 5, 2018 (JP) ................. 2018-227889

(51) Int. Cl.
*H01M 4/36* (2006.01)
*H01M 4/02* (2006.01)
(Continued)

(52) U.S. Cl.
CPC .......... *H01M 4/364* (2013.01); *H01M 4/483* (2013.01); *H01M 4/5825* (2013.01); *H01M 10/0525* (2013.01); *H01M 2004/028* (2013.01)

(58) Field of Classification Search
CPC .... H01M 4/364; H01M 4/483; H01M 4/5825; H01M 10/0525; H01M 2004/028
See application file for complete search history.

(56) References Cited

U.S. PATENT DOCUMENTS

2012/0021287 A1* 1/2012 Lee ................. H01M 10/052
429/223
2012/0231341 A1 9/2012 Kim et al.
(Continued)

FOREIGN PATENT DOCUMENTS

CN 105449269 A 3/2016
JP 2012-43682 A 3/2012
(Continued)

OTHER PUBLICATIONS

Johnson et al. (Electrochemistry Communications 4 (2002) 492-498) (Year: 2002).*
(Continued)

*Primary Examiner* — Brian R Ohara
*Assistant Examiner* — Emily Elizabeth Freeman
(74) *Attorney, Agent, or Firm* — Birch, Stewart, Kolasch & Birch, LLP (57) ABSTRACT

An object is a lithium ion battery having high safety and a high energy density and allows estimation of the remaining capacity of the battery from the discharge voltage, provide a positive electrode for lithium ion secondary batteries that includes a lithium iron phosphate particle, a lithium iron manganese phosphate particle, and a layered oxide-based active material particle at a weight ratio of x:y:z, wherein $0.10 \leq x \leq 0.60$, $0.10 \leq y \leq 0.70$, $0.10 \leq z \leq 0.40$, and $x+y+z=1$, and provide a lithium ion secondary battery characterized in that a discharge curve indicating a relationship between a discharge voltage and a discharge capacity of the lithium ion secondary battery has one non-plateau region between two (Continued)

plateau regions, and a width of the non-plateau region is 20% or more in terms of a state of charge (SOC).

9 Claims, 3 Drawing Sheets

(51) Int. Cl.
*H01M 4/48* (2010.01)
*H01M 4/58* (2010.01)
*H01M 10/0525* (2010.01)

(56) References Cited

U.S. PATENT DOCUMENTS

| | | | | |
|---|---|---|---|---|
| 2014/0147744 | A1* | 5/2014 | Nemoto | H01M 4/133 |
| | | | | 429/211 |
| 2014/0322605 | A1* | 10/2014 | Oh | H01M 4/5825 |
| | | | | 429/221 |
| 2016/0164078 | A1* | 6/2016 | Hong | H01M 4/622 |
| | | | | 429/217 |
| 2017/0133668 | A1* | 5/2017 | Kim | H01M 4/505 |
| 2019/0267664 | A1* | 8/2019 | Lin | H01M 4/58 |

FOREIGN PATENT DOCUMENTS

| | | |
|---|---|---|
| JP | 2013-89522 A | 5/2013 |
| JP | 2018-63191 A | 4/2018 |
| KR | 10-2012-0104484 A | 9/2012 |
| KR | 10-2015-0042807 A | 4/2015 |

OTHER PUBLICATIONS

International Search Report, issued in PCT/JP2019/045400, PCT/ISA/210, dated Feb. 18, 2020.
Written Opinion of the International Searching Authority, issued in PCT/JP2019/045400, PCT/ISA/237, dated Feb. 18, 2020.
Korean Office Action for Korean Application No. 10-2021-7016843, dated Jun. 24, 2021.
Chinese Office Action for Chinese Application No. 201980078106.4, dated Sep. 8, 2021, with an English translation.

\* cited by examiner

POSITIVE ELECTRODE FOR LITHIUM ION SECONDARY BATTERIES, ELECTRODE PASTE FOR LITHIUM ION SECONDARY BATTERIES, AND LITHIUM ION SECONDARY BATTERY

TECHNICAL FIELD

The present invention relates to a positive electrode for lithium ion secondary batteries, an electrode paste for lithium ion secondary batteries, and a lithium ion secondary battery.

BACKGROUND ART

Lithium ion secondary batteries have a high energy density. Meanwhile, there is a possibility that a malfunction of a lithium ion secondary battery may cause the stored energy to be released in a short time, resulting in firing and burning of the battery. Therefore, for lithium ion secondary batteries, improvement of both the energy density and the safety is an important problem.

It is well known that the safety of a lithium ion secondary battery largely depends on its positive electrode active material. Among the positive electrode active materials of lithium ion secondary batteries, positive electrode active materials called layered oxide-based active materials, which are often used in smartphones and electric vehicles, particularly have a high energy density. However, such a layered oxide-based positive electrode active material has a problem of the safety, such as a risk of firing caused by the release of oxygen in the battery due to overcharging.

Meanwhile, it is known that olivine-based positive electrode active materials such as lithium iron phosphate, which are often used in stationary batteries, do not easily release oxygen because the oxygen is covalently bonded to phosphorus, and are thus relatively stable even at a high temperature.

Therefore, it has been studied to achieve both the energy density and the safety by mixing a layered oxide-based positive electrode active material having an excellent energy density and an olivine-based positive electrode active material having excellent safety (see, for example, Patent Documents 1 and 2). It can be expected that the mixing of an olivine-based positive electrode active material having a high electrical resistance with a layered oxide-based positive electrode active material will reduce the current flowing at the time of, for example, internal short-circuit of the battery to be smaller than in the case of using only the layered oxide-based positive electrode active material. This is because the voltage between the positive and negative electrodes of a lithium ion battery is about 3 to 4.4 V, and if Ohm's law (I=V/R) is applied as it is, the magnitude of the short-circuit current at the time of internal short-circuit is inversely proportional to the internal resistance.

PRIOR ART DOCUMENTS

Patent Documents

Patent Document 1: International Publication No. 2010/053174
Patent Document 2: Japanese Patent Laid-open Publication No. 2006-252895

SUMMARY OF THE INVENTION

Problems to be Solved by the Invention

In general, olivine-based positive electrode active materials have an advantage of excellent safety, but also have a problem that the constant discharge voltage makes it difficult to estimate the remaining capacity of the battery from the discharge voltage.

Patent Document 1 describes an attempt to improve the coulombic efficiency by mixing a layered oxide-based positive electrode active material and lithium iron manganese phosphate. However, Patent Document 1 describes no idea of controlling the discharge characteristic by the mixing ratio of the active material, and there is a problem that the remaining capacity management of a battery is difficult in the case of increasing the ratio of lithium iron manganese phosphate for improvement in the safety.

Patent Document 2 discloses improvement in the low temperature characteristic by mixing three active materials and adding an additive. However, in the disclosed example, only lithium iron phosphate is mixed at a maximum of 20%, and the safety still remains a problem.

An object of the present invention is to provide an electrode for lithium ion secondary batteries that allows production of a lithium ion battery having both high safety and improved accuracy of the remaining capacity management.

Solutions to the Problems

The present invention to solve the above-described problems is a positive electrode for lithium ion secondary batteries, the positive electrode including a lithium iron phosphate particle, a lithium iron manganese phosphate particle, and a layered oxide-based active material particle at a weight ratio of x:y:z, wherein $0.10 \leq x \leq 0.60$, $0.10 \leq y \leq 0.70$, $0.10 \leq z \leq 0.40$, and $x+y+z=1$. The present invention is a lithium ion secondary battery including the positive electrode for lithium ion secondary batteries according to the present invention. The present invention is an electrode paste for lithium ion secondary batteries, the electrode paste including a lithium iron phosphate particle, a lithium iron manganese phosphate particle, and a layered oxide-based active material particle at a weight ratio of x:y:z, wherein $0.10 \leq x \leq 0.60$, $0.10 \leq y \leq 0.70$, $0.10 \leq z \leq 0.40$, and $x+y+z=1$. The present invention is a lithium ion secondary battery characterized in that a discharge curve indicating a relationship between a discharge voltage and a discharge capacity of the lithium ion secondary battery has one non-plateau region between two plateau regions, and a width of the non-plateau region is 20% or more in terms of a state of charge (SOC).

Effects of the Invention

According to the present invention, a lithium ion secondary battery can be obtained that has high safety and allows estimation of the remaining capacity of the battery.

EMBODIMENTS OF THE INVENTION

The term "lithium iron phosphate" in the present description refers to a compound represented by $LiFePO_4$. However, the term "lithium iron phosphate" also refers to a compound to which a metal other than Fe is added at a content in the range of 0.5 wt % or more and 5 wt % or less as doping.

The term "lithium iron manganese phosphate" in the present description refers to a compound represented by $LiMn_\alpha Fe_\beta PO_4$ (wherein $\alpha+\beta=1$ and $0.6 \leq \alpha \leq 1$). In the case of $\alpha=1$, no iron is contained, that is, the compound is lithium manganese phosphate. However, such a compound in the present description is not distinguished from lithium iron manganese phosphate and sometimes referred to as lithium iron manganese phosphate. Furthermore, the term "lithium iron manganese phosphate" also refers to a compound to which a metal other than Mn and Fe is added at a content in the range of 0.5 wt % or more and 5 wt % or less as doping as long as the above-described general formula is satisfied in the compound.

The term "layered oxide-based positive electrode active material" in the present description refers to a compound represented by $Li(Ni_x Co_y Mn_z)O_2$ (wherein $x+y+z=1$ and $0 \leq x, y, z, \leq 1$) or $Li(Ni_x Co_y Al_z)O_2$ (wherein $x+y+z=1$, $0.7 \leq x \leq 1$, $0 \leq y \leq 0.2$, and $0 \leq z \leq 0.2$). However, the term "layered oxide-based positive electrode active material" also refers to a compound to which a metal other than the above-described metals is added at a content in the range of 0.5 wt % or more and 5 wt % or less as doping as long as the above-described general formula is satisfied in the compound.

The positive electrode for lithium ion secondary batteries according to the present invention (hereinafter sometimes simply referred to as "positive electrode") preferably includes a lithium iron phosphate particle, a lithium iron manganese phosphate particle, and a layered oxide-based active material particle at a weight ratio of x:y:z (wherein $0.10 \leq x \leq 0.60$, $0.10 \leq y \leq 0.70$, $0.10 \leq z \leq 0.40$, and $x+y+z=1$). By mixing the active material particles at a ratio as described above, a lithium ion secondary battery can be produced that has high safety and allows highly accurate remaining capacity management of the battery. In the present invention, each particle of the lithium iron phosphate, the lithium iron manganese phosphate, and the layered oxide-based active material may be a mixture of particles having different compositions as long as the above-described weight ratio is satisfied as a whole. For example, as the lithium iron manganese phosphate, two or more kinds of active material particles can be used that are different in $\alpha$ and $\beta$ in the composition formula $LiMn_\alpha Fe_\beta PO_4$. In such a case, the total weight of the active materials is regarded as the weight of the lithium iron manganese phosphate particle.

For estimation of the remaining capacity of the battery (state of charge: hereinafter referred to as "SOC"), it is necessary that the discharge voltage changes according to the remaining capacity of the battery. However, in the case of a discharge curve having a long plateau region, the discharge voltage changes very little even if the SOC changes, so that estimation of the SOC from the discharge voltage is difficult.

The discharge curve of a layered oxide-based active material generally has no plateau region, and the discharge voltage gradually decreases from the vicinity of 4.1 V to 2.5 V, so that estimation of the SOC from the discharge voltage is easy. Meanwhile, the discharge curve of lithium iron phosphate has a long plateau region in the vicinity of a discharge voltage of 3.4 V. Lithium iron manganese phosphate has two plateau regions in the vicinity of 4 V correlating to the oxidation of manganese, and in the vicinity of 3.4 V correlating to the oxidation of iron. Therefore, even if lithium iron phosphate and lithium iron manganese phosphate are mixed, the discharge curve still has two plateau regions, so that estimation of the SOC from the discharge voltage is difficult.

In the present invention, the term "plateau region" of the discharge voltage is defined as a portion where the amount of change in the voltage per 1 mAh/g of discharge is 4 mV or less. Since in a battery, the discharge voltage is determined by the combination of the positive electrode and the negative electrode, the term "discharge voltage" in the present description refers to the voltage in evaluation with a half cell using a lithium metal in the negative electrode.

Figure 1:
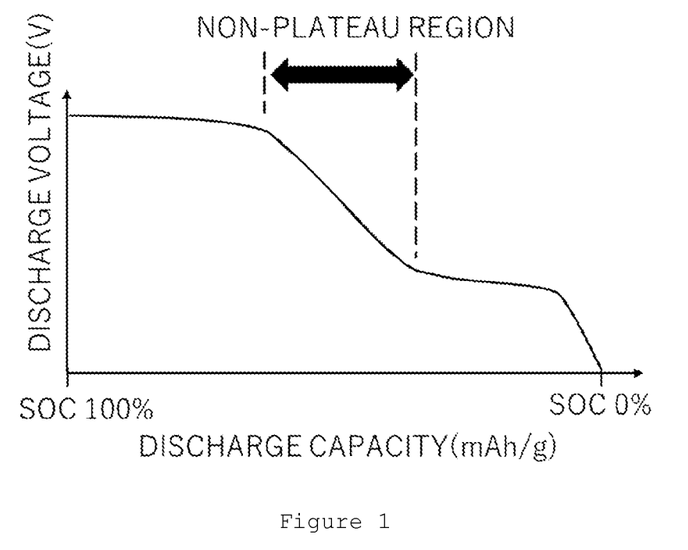
FIG. 1 is a conceptual view of a case in which the non-plateau region in a discharge curve is located at the center of the discharge curve.
Figure 2:
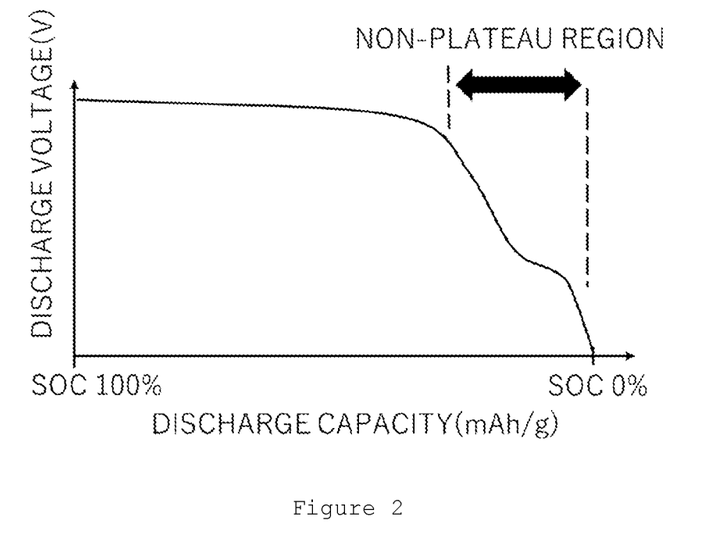
FIG. 2 is a conceptual view of a case in which the non-plateau region in a discharge curve is located at the end of the discharge curve.

In a lithium ion secondary battery in which the positive electrode according to the present invention including an olivine-based active material at a ratio of 50% or more is used (hereinafter sometimes simply referred to as "battery"), it is necessary, for accurate estimation of the SOC from the discharge voltage, that the discharge curve has a non-plateau region located in the central part of the discharge curve as shown in FIG. 1, not at the end of the discharge curve, that is, not in the vicinity of an SOC of 0% as shown in FIG. 2. That is, a non-plateau region needs to be provided between the plateau in the vicinity of 4 V immediately after the start of discharge and the plateau in the vicinity of 3.4 V immediately before the completion of discharge. Correlating the voltage in the non-plateau region with the SOC improves the accuracy of the remaining capacity management of the battery. In addition, the plateau region located in the central part of the discharge curve allows highly accurate estimation of the SOC in the most frequently used capacity region.

In order to ensure the safety of the battery first in the present invention, the ratio of the layered oxide-based active material particle is preferably a certain value or less. Therefore, when the weight ratio of the lithium iron phosphate particle, the lithium iron manganese phosphate particle, and the layered oxide-based active material particle is x:y:z, it is preferable that z be 0.40 or less, that is, x+y be 0.60 or more. From the viewpoint of improving the safety of the battery, z is preferably 0.30 or less.

Meanwhile, the discharge in the non-plateau region in the central part of the discharge curve largely correlates to the oxidation reaction of the layered oxide-based active material. Therefore, a high ratio of the layered oxide-based active material leads to expansion of the non-plateau region. If the non-plateau region is short, the range of the SOC that can be accurately measured is so small that the remaining capacity management of the battery is difficult. For accurate remaining capacity management of the battery, the width of the non-plateau region needs to occupy 20% or more in terms of the SOC, and z is preferably 0.10 or more to achieve the width. For accurate remaining capacity management of the battery, the width of the non-plateau region is preferably 30% or more in terms of the SOC.

Here, the phrase "in terms of the SOC" for indication of the width of the non-plateau region means that the width is determined by the SOC difference between both ends of the non-plateau region.

In a battery in which the positive electrode including a lithium iron phosphate particle, a lithium iron manganese phosphate particle, and a layered oxide-based active material particle is used, the ratio of the lithium iron phosphate and the lithium iron manganese phosphate in the positive electrode is important for ensuring that the discharge curve has a non-plateau region located in the central part of the discharge curve, and in the present invention, it is preferable that $0.10 \leq x \leq 0.60$ and $0.10 \leq y \leq 0.70$.

Figure 3:
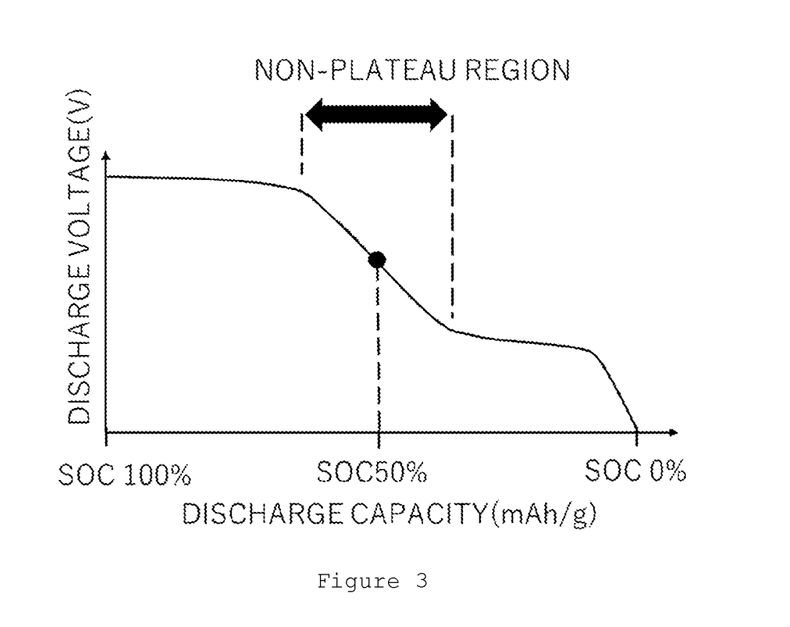
FIG. 3 is a conceptual view of a case in which the non-plateau region in a discharge curve includes an SOC of 50%.
Figure 4:
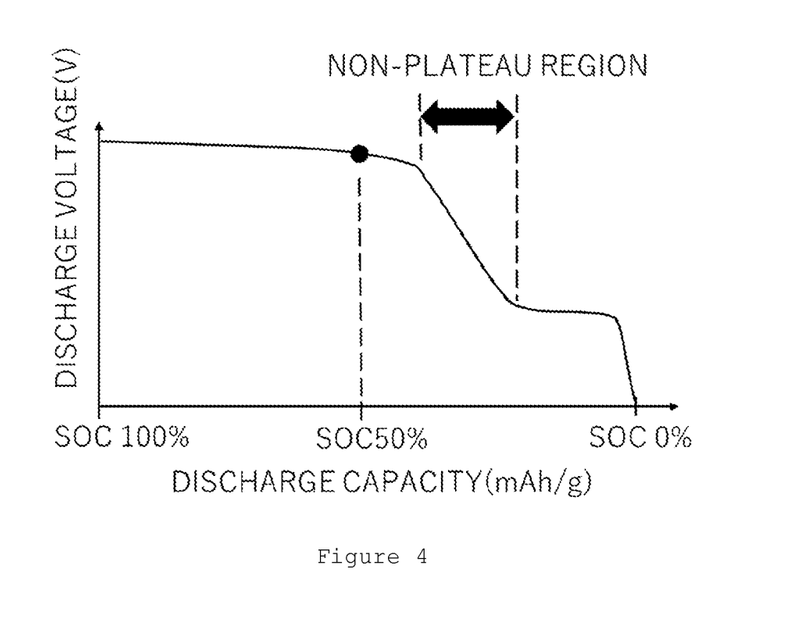
FIG. 4 is a conceptual view of a case in which the non-plateau region in a discharge curve does not include an SOC of 50%.

In the battery in which the positive electrode according to the present invention is used, the discharge curve has a non-plateau region located in the central part of the discharge curve, and the discharge voltage at an SOC of 50% is preferably included in the non-plateau region as shown in FIG. 3 so that the non-plateau region is the most frequently used capacity region, rather than not included in the non-plateau region as shown in FIG. 4.

For ensuring that the discharge voltage at an SOC of 50% is included in the non-plateau region, it is preferable to mix three kinds of active material particles of lithium iron phosphate having a plateau region in the vicinity of 3.4 V, lithium iron manganese phosphate having a plateau region mainly in the vicinity of 4 V, and a layered oxide having no plateau region at an appropriate ratio. Considering that the non-plateau region is closer to the high SOC side when x is large and closer to the low SOC side when y is large, it is particularly preferable that $0.20 \leq x \leq 0.45$ and $0.30 \leq y \leq 0.60$ in the mixing weight ratio.

The lithium ion secondary battery according to the present invention is characterized in that the discharge curve indicating the relationship between the discharge voltage and the discharge capacity of the lithium ion secondary battery has one non-plateau region between two plateau regions. Also with a positive electrode in which an olivine-based active material and/or a layered oxide-based active material is not used, a battery that facilitates the SOC management can be obtained by using two kinds of positive electrode active materials having different plateau regions and one kind of positive electrode active material having no plateau region in combination.

In the case that the discharge curve has a non-plateau region located in the central part of the discharge curve, that is, a non-plateau region is provided between the plateau immediately after the start of discharge and the plateau immediately before the completion of discharge, the discharge curve is understood to have one non-plateau region between two plateau regions. The discharge curve having a non-plateau region located at the end of the discharge curve, that is, in the vicinity of an SOC of 0% is not understood to have one non-plateau region between two plateau regions.

Since lithium iron phosphate has low electron conductivity and low lithium ion conductivity, the lithium iron phosphate particle used in the present invention preferably has an average primary particle size of 50 nm or more and 300 nm or less. If the average primary particle size is less than 50 nm, the specific surface area is so large that the cycle resistance is sometimes deteriorated. If the average primary particle size is more than 300 nm, the electron conductivity and the ion conductivity sometimes start to limit the rate of rapid charge/discharge. The lithium iron phosphate particle can be obtained by a known method such as a solid phase method or a liquid phase method, and commercially available lithium iron phosphate can also be used.

Since lithium iron manganese phosphate has lower electron conductivity and lower lithium ion conductivity than lithium iron phosphate, the lithium iron manganese phosphate particle used in the present invention preferably has an average primary particle size of 30 nm or more and 100 nm or less. If the average primary particle size is less than 30 nm, the specific surface area is so large that the cycle resistance is sometimes deteriorated. If the average primary particle size is more than 100 nm, the electron conductivity and the ion conductivity sometimes start to limit the rate of rapid charge/discharge.

The lithium iron manganese phosphate particle can be obtained by a known method such as a solid phase method or a liquid phase method, and a liquid phase method is preferable from the viewpoint of obtaining a particle having a particle size of 30 nm or more and 100 nm or less further easily. As the liquid phase, water, and in addition, an organic solvent are preferably used for reducing the particle size to the size of a nanoparticle, and the solvent is preferably an alcohol-based solvent. Preferable examples of the solvent specifically include ethylene glycol, diethylene glycol, triethylene glycol, tetraethylene glycol, 2-propanol, 1,3-propanediol, 1,4-butanediol, and dimethylsulfoxide. The synthesis process may include pressurizing for improvement of the crystallinity of the particle.

The layered oxide-based active material particle can be obtained by a solid phase method in accordance with a known method, and a commercially available active material can also be used. The layered oxide-based particle preferably has an average primary particle size of 100 nm or more and 10 μm or less. If the average primary particle size is less than 100 nm, the specific surface area is so large that the cycle resistance is sometimes deteriorated. If the average primary particle size is more than 1 μm, the electron conductivity and the ion conductivity sometimes start to limit the rate of rapid charge/discharge.

By way of compensation for low electron conductivity of lithium iron phosphate and lithium iron manganese phosphate, carbon coating is preferably applied to the surface of the primary particle when lithium iron phosphate and lithium iron manganese phosphate are used. For carbon coating, a method is preferably used in which an active material particle and a saccharide are mixed and then the resulting mixture is fired at 600° C. to 750° C. As the saccharide, glucose or sucrose is preferable from the viewpoint of the small ash content after firing.

In the present invention, the lithium iron phosphate particle, the lithium iron manganese phosphate particle, and the layered oxide-based active material particle are preferably granulated to have an average secondary particle size of 1 μm or more and 20 μm or less. If the average secondary particle size is less than 1 μm, a large amount of solvent is needed to make the active material particle into an electrode paste. If the average secondary particle size is more than 20 μm, it is difficult to obtain a smooth electrode having a thickness of 50 to 100 μm, which is the standard thickness of an electrode for lithium ion secondary batteries. The granulation can employ various methods, and a spray dryer is preferably used in order to obtain a granulated body having a particle size distribution as narrow as possible. The layered oxide-based active material particle has more excellent electron conductivity and more excellent lithium ion conductivity than lithium iron phosphate, and therefore, is also used without granulation in a preferable aspect.

The average primary particle size and the average secondary particle size of the active material particle in the present description are average values obtained by measuring the primary particle sizes of 100 particles with a scanning electron microscope. In this case, the particle size of a non-spherical particle is the average value of the major axis and the minor axis that can be measured in a two-dimensional image.

The composition of the positive electrode according to the present invention is not particularly limited as long as the lithium iron phosphate particle, the lithium iron manganese phosphate particle, and the layered oxide-based active material particle are included at a predetermined ratio. The positive electrode can be typically obtained by dispersing the active material particle and an additive such as a binder or a conductive auxiliary agent in a dispersion medium such as N-methylpyrrolidinone or water to form an electrode paste, then applying the electrode paste to a current collector such as an aluminum foil, and drying and pressing the resulting product.

The weight ratio of the binder in the positive electrode is preferably 0.3% or more and 10% or less. If the weight ratio is less than 0.3%, the addition effect is low, and such a state is not preferable. If the binder, which is an insulator, is added in an amount greater than 10%, the conductivity of the electrode is largely reduced, and such a state is not preferable. As the binder, polyvinylidene fluoride, styrene-butadiene rubber, or the like can be used.

The weight ratio of the conductive auxiliary agent in the positive electrode is preferably 0.3% or more and 10% or less. If the weight ratio is less than 0.3%, the addition effect is low, and such a state is not preferable. If the conductive auxiliary agent is added in an amount greater than 10%, the effect of inhibiting the movement of lithium ions is remarkable, and such a state is not preferable. As the conductive auxiliary agent, acetylene black, Ketjen black, a carbon fiber, a carbon nanotube, graphene, or the like can be used.

The solid content concentration of the electrode paste can be appropriately adjusted according to the coating process, and is preferably 30% or more and 80 or less so that the electrode paste has an appropriate viscosity leading to a uniform coating film thickness.

The mixture layer produced by solidifying the electrode paste after pressing preferably has a thickness of 10 μm or more and 200 μm or less. If the thickness is less than 10 μm, the energy density of the battery tends to decrease, and if the thickness is more than 200 μm, the rapid charge/discharge characteristic tends to deteriorate.

EXAMPLES

Hereinafter, the present invention will be described specifically with reference to Examples, but the present invention is not limited to Examples described below.

[Measurement A] Measurement of Discharge Characteristic of Positive Electrode

A 2032 coin battery was produced in which the electrode plate, produced in each of Examples and Comparative Examples, cut out to have a diameter of 15.9 mm was used as a positive electrode, a lithium foil cut out to have a diameter of 16.1 mm and a thickness of 0.2 mm was used as a negative electrode, SETELA (registered trademark) (manufactured by Toray Industries, Inc.) cut out to have a diameter of 20 mm was used as a separator, and a solution of ethylene carbonate:diethyl carbonate=3:7 (volume ratio) containing 1 M of $LiPF_6$ was used as an electrolytic solution, and was evaluated electrochemically.

In the measurement, the cut-off voltage was 2.5 V, and the maximum charge voltage was 4.3 V. Charge and discharge were performed three times at a rate of 0.1 C. In the discharge curve of the third discharge, it was judged whether the non-plateau region was located in the central part of the discharge curve, that is, a portion sandwiched between the plateau in the vicinity of 4.0 V and the plateau in the vicinity of 3.4 V. If the non-plateau region is formed from an SOC of 25% or less, the location of the non-plateau region is not suitable for the remaining capacity management of the battery. Therefore, such a location was regarded as "the end of discharge", and such a case was distinguished from the case in which the non-plateau region was located in the central part. If the non-plateau region continued over the entire discharge curve, the location of the non-plateau region was regarded as "the entire discharge curve".

From the discharge curve, it was also evaluated how long the non-plateau region continued by the percent in terms of the SOC and whether an SOC of 50% was included in the non-plateau region of the discharge curve. For distinction between the non-plateau region and the plateau region, the voltage reduction per 1 mAh/g of discharge was measured from the start of discharge, and the region in which the voltage reduced by 4 mV or more was regarded as a non-plateau region.

[Measurement B] Maximum Cell Temperature During Crush Test

A stacked laminate cell as a 3 Ah cell was produced using a positive electrode produced in the same manner as in Measurement A, a commercially available carbon-based negative electrode (negative electrode active material: artificial graphite MAG manufactured by Hitachi Chemical Co., Ltd.) as a negative electrode, SETELA (registered trademark) as a separator, and, as an electrolytic solution, a solution of ethylene carbonate:diethyl carbonate=3:7 (volume ratio) containing 1 M of $LiPF_6$. The number of the positive electrodes (size: 70 mm×40 mm) to be stacked was 21, and the number of the negative electrodes (size: 74 mm×44 mm) was 22. The capacity ratio (NP ratio) of the positive electrode to the opposite negative electrode was 1.05.

The produced battery was charged and discharged three times at 0.1 C, then fully charged again at 0.1 C, and subjected to a crush test. The crush test was performed by pressing a round bar having a radius of 10 mm against the central part of the fully charged battery at a rate of 10 mm/sec with a maximum load of 10 kN. A thermocouple was attached at a location 10 mm away from the place where the round bar was pressed, and the maximum cell temperature during crush was measured. In addition, the presence or absence of fire and smoke was visually confirmed.

Example 1

To 350 g of pure water, 360 mmol of lithium hydroxide monohydrate was added. To the resulting solution, 120 mmol of phosphoric acid was further added using an 85% phosphoric acid aqueous solution, and 120 mmol of iron (II) sulfate heptahydrate was further added. The resulting solution was transferred to an autoclave and kept heated for 4 hours so that the inside of the container was maintained at 190° C. After the heating, the supernatant of the solution was removed to obtain lithium iron phosphate as a precipitate. The resulting lithium iron phosphate was washed with pure water, then the supernatant was removed by centrifugation five times, and finally pure water was added again to prepare a dispersion liquid.

Subsequently, glucose having the same weight as 12% by weight of lithium iron phosphate in the dispersion liquid was added to the dispersion liquid and dissolved, and then pure water was added to adjust the solid content concentration of the dispersion liquid to 50%. The resulting dispersion liquid was dried and granulated by a spray dryer (MDL-050B manufactured by Fujisaki Denki K. K.) using hot air at 200° C. The resulting particulate matter was heated in a rotary kiln (Desktop Rotary Kiln manufactured by Takasago Industry Co., Ltd.) at 700° C. for 4 hours in a nitrogen atmosphere to obtain carbon-coated lithium iron phosphate.

To 150 g of pure water, 200 g of dimethyl sulfoxide was added, and 360 mmol of lithium hydroxide monohydrate was added. To the resulting solution, 120 mmol of phosphoric acid was further added using an 85% phosphoric acid aqueous solution, and 84 mmol of manganese sulfate monohydrate and 36 mmol of iron (II) sulfate heptahydrate were further added. The resulting solution was transferred to an autoclave and kept heated for 4 hours so that the inside of the container was maintained at 150° C. After the heating, the supernatant of the solution was removed to obtain lithium iron manganese phosphate as a precipitate. The resulting lithium iron manganese phosphate was washed with pure water, then the supernatant was removed by centrifugation five times, and finally pure water was added again to prepare a dispersion liquid.

Subsequently, glucose having the same weight as 15% by weight of lithium iron manganese phosphate in the dispersion liquid was added to the dispersion liquid and dissolved, and then pure water was added to adjust the solid content concentration of the dispersion liquid to 50%. The resulting dispersion liquid was dried and granulated by a spray dryer (MDL-050B manufactured by Fujisaki Denki K. K.) using hot air at 200° C. The resulting particulate matter was heated in a rotary kiln (Desktop Rotary Kiln manufactured by Takasago Industry Co., Ltd.) at 700° C. for 4 hours in a nitrogen atmosphere to obtain carbon-coated lithium iron manganese phosphate.

The resulting lithium iron phosphate particle, lithium iron manganese phosphate particle, and a layered oxide-based active material particle ($LiNi_{0.5}Co_{0.2}Mn_{0.3}O_2$ granulated body having an average particle size of 13 μm manufactured by Umicore S. A.) were mixed at a weight ratio of 0.30:0.50:0.20 using a rotating and revolving mixer (THINKY MIXER ARE-310 manufactured by THINKY CORPORATION) under a stirring mode condition of 2,000 rpm for 5 minutes.

Acetylene black (Li-400 manufactured by Denka Company Limited) and a binder (KF POLYMER L #9305 manufactured by KUREHA CORPORATION) were mixed, then the mixture of the active materials was added, and the resulting mixture was kneaded in a mortar. At that time, the mass ratio of each material contained, the active materials: acetylene black:the binder, was set to 90:5:5. Then, the solid content concentration was adjusted to 45% by mass by adding N-methylpyrrolidinone to obtain an electrode slurry. If the resulting slurry had no fluidity, N-methylpyrrolidinone was appropriately added until the slurry had fluidity.

The resulting electrode slurry was applied to an aluminum foil (thickness: 18 μm) using a doctor blade (300 μm), dried at 80° C. for 30 minutes, and then pressed to produce an electrode plate.

Figure 5:
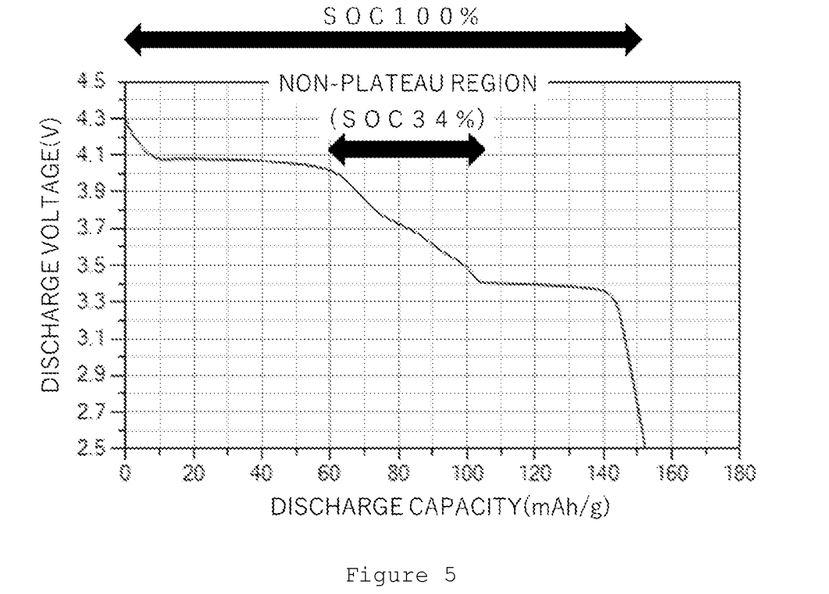
FIG. 5 is a discharge curve of the electrode plate produced in Example 1, obtained by Measurement Example A.

FIG. 5 shows a discharge curve obtained as a result of measuring the discharge characteristic of the electrode plate in accordance with Measurement A.

Example 2

An electrode plate was produced in the same manner as in Example 1 except that the mixing ratio of the lithium iron phosphate particle, the lithium iron manganese phosphate particle, and the layered oxide-based active material particle was 0.30:0.55:0.15.

Example 3

An electrode plate was produced in the same manner as in Example 1 except that the mixing ratio of the lithium iron phosphate particle, the lithium iron manganese phosphate particle, and the layered oxide-based active material particle was 0.40:0.40:0.20.

Example 4

An electrode plate was produced in the same manner as in Example 1 except that the mixing ratio of the lithium iron phosphate particle, the lithium iron manganese phosphate particle, and the layered oxide-based active material particle was 0.30:0.35:0.35.

Example 5

An electrode plate was produced in the same manner as in Example 1 except that the mixing ratio of the lithium iron phosphate particle, the lithium iron manganese phosphate particle, and the layered oxide-based active material particle was 0.55:0.20:0.25.

Example 6

An electrode plate was produced in the same manner as in Example 1 except that the mixing ratio of the lithium iron phosphate particle, the lithium iron manganese phosphate particle, and the layered oxide-based active material particle was 0.23:0.65:0.12.

Comparative Example 1

An electrode plate was produced in the same manner as in Example 1 except that the mixing ratio of the lithium iron phosphate particle, the lithium iron manganese phosphate particle, and the layered oxide-based active material particle was 1:0:0, that is, the lithium iron phosphate was used alone.

Comparative Example 2

An electrode plate was produced in the same manner as in Example 1 except that the mixing ratio of the lithium iron phosphate particle, the lithium iron manganese phosphate particle, and the layered oxide-based active material particle was 0:1:0, that is, the lithium iron manganese phosphate was used alone.

Comparative Example 3

An electrode plate was produced in the same manner as in Example 1 except that the mixing ratio of the lithium iron phosphate particle, the lithium iron manganese phosphate particle, and the layered oxide-based active material particle was 0.00:0.00:1.00, that is, the layered oxide was used alone.

Comparative Example 4

An electrode plate was produced in the same manner as in Example 1 except that the mixing ratio of the lithium iron phosphate particle, the lithium iron manganese phosphate particle, and the layered oxide-based active material particle was 0.50:0.50:0.00.

Comparative Example 5

An electrode plate was produced in the same manner as in Example 1 except that the mixing ratio of the lithium iron phosphate particle, the lithium iron manganese phosphate particle, and the layered oxide-based active material particle was 0.00:0.80:0.20.

Comparative Example 6

An electrode plate was produced in the same manner as in Example 1 except that the mixing ratio of the lithium iron phosphate particle, the lithium iron manganese phosphate particle, and the layered oxide-based active material particle was 0.80:0.10:0.10.

Comparative Example 7

An electrode plate was produced in the same manner as in Example 1 except that the mixing ratio of the lithium iron phosphate particle, the lithium iron manganese phosphate particle, and the layered oxide-based active material particle was 0.10:0.80:0.10.

Example 7

An electrode plate was produced in the same manner as in Example 1 except that lithium manganate $LiMn_2O_4$ (manufactured by Hohsen Corp.) particle was used instead of the lithium iron manganese phosphate particle.

The positive electrode obtained in each of Examples and Comparative Examples was measured in accordance with Measurement A and B. Table 1 shows the results.

The invention claimed is:

1. A positive electrode for lithium ion secondary batteries, the positive electrode comprising an active material, wherein each active material in the positive electrode consists of a lithium iron phosphate particle, a lithium iron manganese phosphate particle, and a layered oxide-based active material particle at a respective weight ratio of x:y:z, wherein $0.10 \leq x \leq 0.60$, $0.10 \leq y \leq 0.70$, $0.10 \leq z \leq 0.40$, and $x+y+z=1$;

wherein the layered oxide-based positive electrode active material is represented by:

$Li(Ni_aCo_bMn_c)O_2$, wherein $a+b+c=1$, $0 \leq a \leq 1$, $0 \leq b \leq 1$, and $0 \leq c \leq 1$, or $Li(Ni_dCo_eAl_f)O_2$, wherein $d+e+f=1$, $0.7 \leq d \leq 1$, $0 \leq e \leq 0.2$, and $0 \leq f \leq 0.2$.

2. The positive electrode for lithium ion secondary batteries according to claim 1, wherein $z \leq 0.30$.

3. The positive electrode for lithium ion secondary batteries according to claim 1, wherein $0.20 \leq x \leq 0.45$ and $0.30 \leq y \leq 0.60$.

4. A lithium ion secondary battery comprising the positive electrode for lithium ion secondary batteries according to claim 1.

5. An electrode paste for lithium ion secondary batteries, the electrode paste comprising an active material, wherein each active material in the electrode paste consists of a lithium iron phosphate particle, a lithium iron manganese phosphate particle, and a layered oxide-based active material particle at a respective weight ratio of x:y:z, wherein $0.10 \leq x \leq 0.60$, $0.10 \leq y \leq 0.70$, $0.10 \leq z \leq 0.40$, and $x+y+z=1$;

wherein the layered oxide-based positive electrode active material is represented by:

$Li(Ni_aCo_bMn_c)O_2$, wherein $a+b+c=1$, $0 \leq a \leq 1$, $0 \leq b \leq 1$, and $0 \leq c \leq 1$, or $Li(Ni_dCo_eAl_f)O_2$, wherein $d+e+f=1$, $0.7 \leq d \leq 1$, $0 \leq e \leq 0.2$, and $0 \leq f \leq 0.2$.

TABLE 1

| | Weight mixing ratio of active material particles (x:y:z) | | | Battery evaluation result | | | |
|---|---|---|---|---|---|---|---|
| | | | | | Width of non-plateau | | Maximum cell |
| | Lithium iron phosphate (x) | Lithium iron manganese phosphate (y) | Layered oxide (z) | Location of non-plateau region in discharge curve | region (in terms of SOC (%)) | Location of SOC of 50% in discharge curve | temperature (° C.) during crush test |
| Example 1 | 0.30 | 0.50 | 0.20 | Central part | 34 | Non-plateau region | 88 |
| Example 2 | 0.30 | 0.55 | 0.15 | Central part | 30 | Non-plateau region | 82 |
| Example 3 | 0.40 | 0.40 | 0.20 | Central part | 29 | Non-plateau region | 91 |
| Example 4 | 0.30 | 0.35 | 0.35 | Central part | 38 | Non-plateau region | 135 |
| Example 5 | 0.55 | 0.20 | 0.25 | Central part | 27 | Plateau region | 90 |
| Example 6 | 0.23 | 0.65 | 0.12 | Central part | 35 | Plateau region | 75 |
| Comparative Example 1 | 1.00 | 0.00 | 0.00 | End of discharge | 0 | Plateau region | 71 |
| Comparative Example 2 | 0.00 | 1.00 | 0.00 | End of discharge | 6 | Plateau region | 74 |
| Comparative Example 3 | 0.00 | 0.00 | 1.00 | Whole discharge curve | 100 | Non-plateau region | >500 (firing) |
| Comparative Example 4 | 0.50 | 0.50 | 0.00 | Central part | 11 | Plateau region | 76 |
| Comparative Example 5 | 0.00 | 0.80 | 0.20 | End of discharge | 14 | Plateau region | 91 |
| Comparative Example 6 | 0.80 | 0.10 | 0.10 | Central part | 10 | Plateau region | 90 |
| Comparative Example 7 | 0.10 | 0.80 | 0.10 | Central part | 12 | Plateau region | 89 |
| Example 7 | 0.30 | 0.50 (Lithium manganate) | 0.20 | Central part | 56 | Non-plateau region | 288 |

6. The positive electrode for lithium ion secondary batteries according to claim 1, wherein the layered oxide-based positive electrode active material is represented by:

Li($Ni_d Co_e Al_f$)$O_2$, wherein d+e+f=1, 0.7≤d≤1, 0≤e≤0.2, and 0≤f≤0.2.

7. The positive electrode for lithium ion secondary batteries according to claim 1, wherein 0.23≤x≤0.55, 0.20≤y≤0.65, 0.12≤z≤0.35, and x+y+z=1.

8. The positive electrode for lithium ion secondary batteries according to claim 1, wherein the layered oxide-based positive electrode active material is represented by:

Li($Ni_a Co_b Mn_c$)$O_2$, wherein a+b+c=1, 0≤a≤1, 0≤b≤1, and 0≤c≤1.

9. The positive electrode for lithium ion secondary batteries according to claim 1, wherein all active materials would reversibly deinsert lithium ions.

* * * * *